United States Patent
Choi et al.

(10) Patent No.: US 12,394,814 B2
(45) Date of Patent: Aug. 19, 2025

(54) MATERIAL TRANSFERRING APPARATUS FOR BATTERY MANUFACTURING

(71) Applicant: SK On Co., Ltd., Seoul (KR)

(72) Inventors: Hwa Sun Choi, Daejeon (KR); Yeon Je Kim, Daejeon (KR); Yeon Ho Park, Daejeon (KR); Dong Ik Oh, Daejeon (KR)

(73) Assignee: SK ON CO., LTD., Seoul (KR)

( * ) Notice: Subject to any disclaimer, the term of this patent is extended or adjusted under 35 U.S.C. 154(b) by 310 days.

(21) Appl. No.: 17/949,704

(22) Filed: Sep. 21, 2022

(65) Prior Publication Data
US 2023/0231174 A1 Jul. 20, 2023

(51) Int. Cl.
*H01M 10/04* (2006.01)
(52) U.S. Cl.
CPC ............... *H01M 10/0404* (2013.01)
(58) Field of Classification Search
CPC .. H01M 10/0404; B65G 57/09; B65G 63/002
USPC ............ 29/283; 269/121
See application file for complete search history.

(56) References Cited

U.S. PATENT DOCUMENTS

| | | | | |
|---|---|---|---|---|
| 5,431,530 A | * | 7/1995 | Kobayashi | H01M 10/14 414/794.4 |
| 6,559,928 B1 | * | 5/2003 | Aoki | G03F 7/7075 355/72 |
| 6,648,581 B2 | * | 11/2003 | Gibson | B65G 1/1375 187/222 |
| 7,891,502 B2 | * | 2/2011 | Chien | H05K 13/0069 361/802 |
| 10,644,344 B1 | * | 5/2020 | Ye | B65G 47/56 |
| 2003/0120387 A1 | * | 6/2003 | Sherwin | B25J 15/0052 294/2 |
| 2014/0356676 A1 | * | 12/2014 | Yasooka | H01M 50/291 429/99 |
| 2020/0168493 A1 | * | 5/2020 | Sunugatov | H01L 21/67259 |
| 2021/0135180 A1 | | 5/2021 | Kang | |
| 2022/0294063 A1 | * | 9/2022 | Lee | H01M 50/256 |
| 2023/0085522 A1 | * | 3/2023 | Kim | H01M 10/0404 429/7 |

FOREIGN PATENT DOCUMENTS

| | | |
|---|---|---|
| CN | 108417879 A | 8/2018 |
| CN | 112456087 A | 3/2021 |
| KR | 10-2010-0108895 A | 10/2010 |
| KR | 10-2014-0009015 A | 1/2014 |
| KR | 10-2018-0094629 A | 8/2018 |
| KR | 10-2021-0051733 A | 5/2021 |

OTHER PUBLICATIONS

Extended European Search Report for European Patent Application No. 22198639.1 issued by the European Patent Office on May 2, 2024.

* cited by examiner

*Primary Examiner* — Seahee Hong
(74) *Attorney, Agent, or Firm* — IP & T GROUP LLP (57) ABSTRACT

A material transferring apparatus for battery manufacturing includes a support unit having a support region for supporting a moving object and having a first contact surface, a moving unit having a second contact surface in contact with the support unit and moving the support unit, and coupling units provided on the support unit and the moving unit, respectively, and contacting each other before the first contact surface and the second contact surface come into contact with each other.

11 Claims, 8 Drawing Sheets

MATERIAL TRANSFERRING APPARATUS FOR BATTERY MANUFACTURING

CROSS-REFERENCE TO RELATED APPLICATION(S)

This application claims benefit of priority to Korean Patent Application No. 10-2022-0007639 filed on Jan. 19, 2022 in the Korean Intellectual Property Office, the disclosure of which is incorporated herein by reference in its entirety.

BACKGROUND

1. Field

The present disclosure relates to a material transferring apparatus for battery manufacturing.

2. Description of Related Art

Secondary batteries are widely used not only in small electronic devices such as mobile phones and laptops, but also in medium and large-sized mechanical devices such as electric vehicles (EVs), and have the advantage of being rechargeable and reusable.

Such a secondary battery may be manufactured by accommodating an electrode assembly composed of a positive electrode plate, a negative electrode plate, and a separator in a case, injecting an electrolyte into the case and then sealing the case.

The secondary battery manufacturing process may be largely divided into an electrode process of manufacturing positive and negative plates, an assembly process of forming an electrode assembly with a positive electrode plate, a negative electrode plate, and a separator and impregnating the electrode assembly with an electrolyte, and a formation process of imparting electrical properties to the electrode assembly and testing performance.

Materials required for secondary battery manufacturing may become a final product, a battery, through these processes step by step. Therefore, it may be very important to rapidly move the materials required for battery manufacturing or partially completed semi-finished products to respective processes to improve battery manufacturing efficiency.

SUMMARY

An aspect of the present disclosure is to improve battery manufacturing efficiency.

An aspect of the present disclosure is to automate a battery manufacturing process and improve the convenience of manufacturing operations.

According to an aspect of the present disclosure, a material transferring apparatus for battery manufacturing includes a support unit having a support region for supporting an object and having a first contact surface; a moving unit having a second contact surface in contact with the support unit and moving the support unit; and coupling units provided on the support unit and the moving unit, respectively, and contacting each other before the first contact surface and the second contact surface come into contact with each other.

The coupling unit may be maintained in a state of being in contact with each other while the first contact surface and the second contact surface are in contact with each other.

The support unit may include a support frame having the support region; and a guide frame connected to the support unit and disposed at the periphery of the support region to contact the object. The guide frame may be provided to vary an area of the support region.

The guide frame may include a fixed side frame fixed to the support frame and contacting the moving unit; a guide member connected to the support frame and extending in a thickness direction of the object to contact a side surface of the object; and a moving side frame connected to the guide member and the fixed side frame and extending in a longitudinal direction or a width direction of the object. The moving side frame may be provided such that a position connected to the fixed side frame and the guide member is varied.

The coupling unit may include a first coupling unit provided in a region facing the fixed side frame in the moving unit; and a second coupling unit provided in a region facing the moving unit in the fixed side frame. The first coupling unit and the second coupling unit may be provided to be in contact with each other before the moving unit and the fixed side frame come into contact, and may be maintained in a state of being in contact with each other while the moving unit contacts the fixed side frame.

The first coupling unit may include at least one coupling protrusion protruding from the moving unit toward the fixed side frame, and the second coupling unit may include at least one coupling groove, which is formed in the fixed side frame and into which the coupling protrusion is inserted.

The coupling protrusion and the fixed side frame may include a material containing a magnetic material.

The coupling protrusion may include a curved region sliding in the coupling groove.

The coupling groove may include a section inclined with respect to the longitudinal direction of the object.

The moving unit may include at least one mobile robot arm in contact with the fixed side frame. The at least one mobile robot arm may include a first bent extension portion formed by bending and extending an end thereof in a direction of the fixed side frame. The fixed side frame may include a second bent extension portion formed by bending and extending an end thereof in a direction of the at least one mobile robot arm and contacting the first bent extension portion. The first bent extension portion may be present below the second bending extension portion in a direction of gravity, while the at least one mobile robot arm moves the support unit.

A plurality of the fixed side frames may be disposed to face each other in the support frame and may include one or more first gap adjustment holes, a plurality of the moving side frames may be disposed to face each other in the support frame and include one or more second gap adjustment holes, and a plurality of the guide members may be disposed to face the first gap adjustment hole and the second gap adjustment hole.

The support unit may further include one or more first fixing members inserted into the one or more first gap adjustment holes, ends of the one or more first fixing members being in contact with the guide member; and a plurality of second fixing members inserted into the one or more second gap adjustment holes, ends of the plurality of second fixing member being in contact with the guide member.

The support frame may include a plurality of first fastening holes spaced apart from each other in the longitudinal direction and the width direction of the object; and a plurality of second fastening holes spaced apart from each other in the width direction of the object. The fixed side frame may include a plurality of third fastening holes facing the plurality of second fastening holes, the guide member may include a fourth fastening hole opposite to the plurality of first fastening holes, and the plurality of first fastening holes, the plurality of second fastening holes, the plurality of third fastening holes and the fourth fastening hole may be provided with a fastening member inserted thereinto.

The fastening member may include a first fastening member inserted into the plurality of second fastening holes and the plurality of third fastening holes to fix the fixed side frame to the support frame; and a second fastening member inserted into the plurality of first fastening holes and the fourth fastening hole to fix the guide member to the support frame.

A plurality of the fixed side frames may be spaced apart from each other in the longitudinal direction or the width direction of the object, a plurality of the mobile robot arms may be in contact with the plurality of fixed side frames in a state in which ends thereof are spaced apart from each other by a first length, and a plurality of the fixed side frames may be fixed to the support frame in such a manner that surfaces in contact with the plurality of mobile robot arms are spaced apart by the first length.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, in order to help the understanding of the description of the embodiment, elements described with the same reference numerals in the accompanying drawings are the same elements, and in respective embodiments, related components among components performing the same action are indicated by the same or similar numbers.

In addition, to clarify the gist of the present disclosure, descriptions of elements and techniques well known by the prior art will be omitted, and the present disclosure will be described in detail below with reference to the accompanying drawings.

However, the spirit of the present disclosure is not limited to the presented embodiment, and specific components may be proposed in other forms in which specific elements are added, changed, or deleted by those skilled in the art, but this is also included within the scope of the same spirit as the present disclosure.

Hereinafter, the X axis illustrated in the accompanying drawings is the longitudinal direction of the moving object, the Y axis is the width direction, and the Z axis is the thickness direction.

Figure 1:
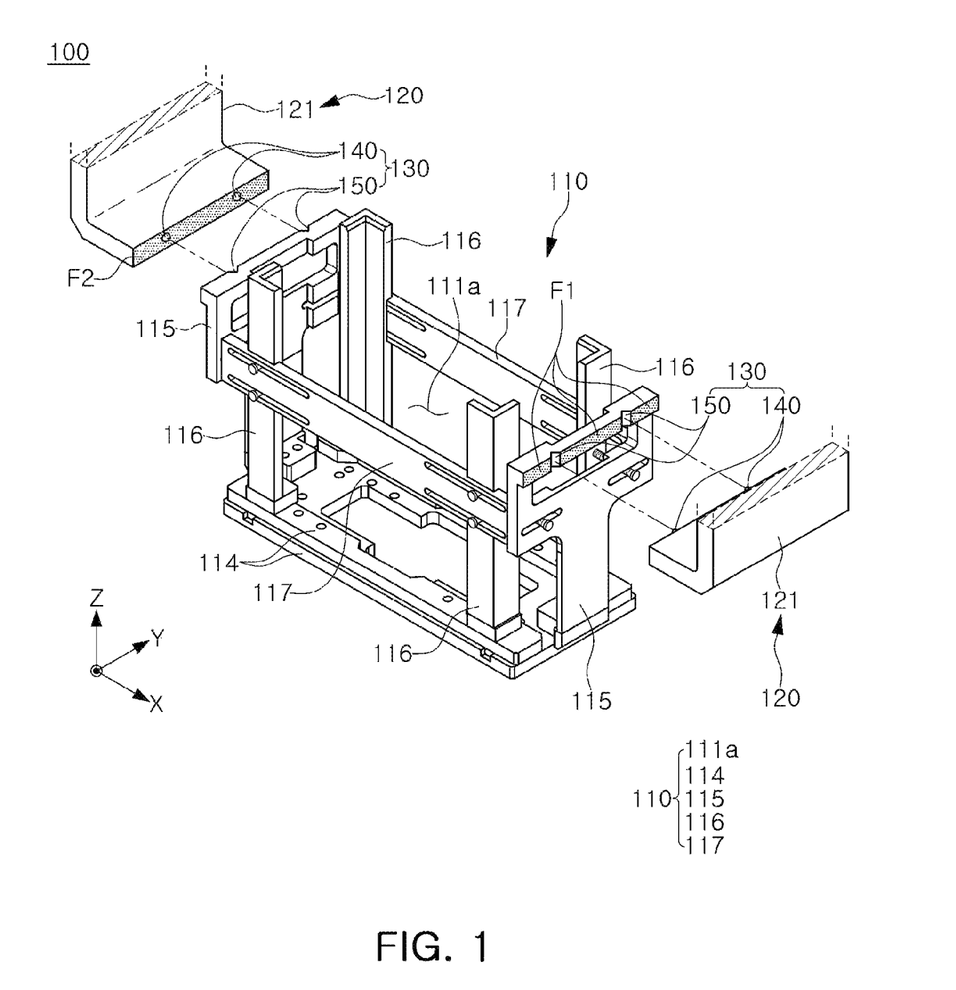
FIG. 1 is a perspective view of a material transferring apparatus for battery manufacturing according to an embodiment.

FIG. 1 is a perspective view of a material transferring apparatus for battery manufacturing according to an embodiment.

As illustrated in FIG. 1, the material transferring apparatus for battery manufacturing according to an embodiment may use a method in which a moving unit 120 lifts and moves a support unit 110 in a state in which an object to be moved (not illustrated) is seated in a support region 111*a* of the support unit 110.

The moving unit 120 may be electrically or physically coupled to a separate control unit (not illustrated), and the operation thereof may be controlled by the control unit (not illustrated). An operation in which the moving unit 120 is in contact with the support unit 110, an operation of moving the support unit 110 by the moving unit 120, and an operation in which the moving unit 120 is released from contact with the support unit 110 may be controlled by the control unit (not illustrated). In an embodiment, the control unit (not illustrated) may be a programmable logic controller (PLC).

In an embodiment, the moving unit 120 may include at least one mobile robot arm 121 connected to the control unit (not illustrated) and in contact with or released from the support unit 110. The operation of the mobile robot arm 121 may be controlled by the control unit (not illustrated), and may be in contact with or released from the support unit 110 by the control unit (not illustrated).

The support unit 110 may include the support region 111*a* on which an object (not illustrated) is seated. The support unit 110 is in close contact with the object seated in the support region 111*a* to fix and protect the object such that the object is not shaken or not damaged during movement.

In an embodiment, the support unit 110 may be provided such that the volume of the support region 111*a* may be varied. When the volume of the support region 111*a* is provided to be variable, the support unit 110 may be in close contact with the object regardless of the size of the object. Accordingly, objects of various sizes may be easily supported and fixed.

In addition, accordingly, it is possible to prevent meandering or vibrations of the object while the support unit 110 is moved by the moving unit 120, such that the object may be quickly put into the post-process, thereby contributing to improving the efficiency of the manufacturing process.

In an embodiment, the support unit 110 may include a first contact surface F1, and the moving unit 120 may include a second contact surface F2. Ina state in which the first contact surface F1 and the second contact surface F1 are in contact, the moving unit 120 may lift and move the support unit 110.

A coupling unit 130 may be respectively provided in the support unit 110 and the moving unit 120, and while the first contact surface F1 and the second contact surface F2 maintain mutual contact, the coupling units 130 provided in the support unit 110 and the moving unit 120, respectively, may be maintained in the state of being in contact with each other. The coupling unit 130 may be provided on one surface the support unit 110 on which the first contact surface F1 is present, and an area excluding the coupling unit 130 on the one surface of the support unit 110 may be provided as the first contact surface F1.

The coupling unit 130 may also be provided on one surface of the moving unit 120 on which the second contact surface F2 is present, but an area excluding the coupling unit 130 on the one surface of the moving unit 120 may be the second contact surface F2.

Before the moving unit 120 is moved in the direction of the support unit 110 and the first contact surface F1 and the second contact surface F2 come into contact with each other, the coupling units 130 provided on the support unit 110 and the moving unit 120, respectively, may contact each other.

Before the support unit 110 and the moving unit 120 contact, the coupling units 130 provided in the support unit 110 and the moving unit 120, respectively, may contact each other and serve to guide the contact and coupling of the support unit 110 and the moving unit 120.

The coupling unit 130 may be provided at an optimal position suitable for supporting the load of the object. In an embodiment, the coupling unit 130 may be formed in a position in which at least a partial area of the moving unit 120 may be opposed to the center of the support unit 110 in the Y-axis direction when the first contact surface F1 and the second contact surface F2 contact each other. Therefore, the moving unit 120 may move the support unit 110 while preventing the support unit 110 from sagging or meandering in either direction.

The coupling unit 130 respectively provided in the support unit 110 and the moving unit 120 may be provided in contact with each other in the same position as the previous position even when the first contact surface F1 and the second contact surface F2 come into contact again after the first contact surface F1 and the second contact surface F2 are released from contact. Therefore, once the contact position of the moving unit 120 and the support unit 110 is set, it is not necessary to newly set the contact position of the moving unit 120 and the coupling unit 130 whenever they are re-contacted after the release of the contact between the moving unit 120 and the support unit 110.

In an embodiment, the coupling unit 130 may be detachably provided to the moving unit 120 and the support unit 110. The coupling unit 130 may be provided in the form of an insert block to be coupled to or disconnected from the moving unit 120 and the support unit 110.

In this case, a plurality of grooves (not illustrated) into which the insert block may be inserted are provided in the moving unit 120 and the support unit 110, and when an insert block is inserted into any one of a plurality of grooves (not illustrated), the position of the coupling unit 130 in the moving unit 120 and the support unit 110 may be easily adjusted. However, this is not necessarily limited by the present disclosure, and may be appropriately selected and applied according to the working environment.

After the coupling units 130 are in contact with each other, the first contact surface F1 and the second contact surface F2 may contact each other. As described above, after the first contact surface F1 and the second contact surface F2 contact each other, the moving unit 120 may move the support unit 110.

By the coupling unit 130, a contact position between the moving unit 120 and the support unit 110 may be set, and the operation of aligning the support unit 110 on the moving unit 120 may be omitted. According to the coupling unit 130, a path in which the moving unit 120 and the support unit 110 may be combined with the fastest may be secured, and this path may be used repeatedly.

As such, when the coupling of the moving unit 120 and the supporting unit 110 may be made through the coupling unit 130, the coupling of the moving unit 120 and the supporting unit 110 may be completed quickly, and since there is no need to newly set the contact position between the moving unit 120 and the support unit 110 whenever an object (not illustrated) is replaced, the efficiency of the battery manufacturing process may be improved, and the convenience of moving materials for manufacturing the battery may be improved.

In an embodiment, the support unit 110 may include a support frame 114 having the support region 111a, and guide frames 115, 116 and 117 connected to the support frame 114, disposed at the periphery of the support region 111a and contacting an object (not illustrated).

In an embodiment, the guide frames 115, 116 and 117 may include a plurality of fixed side frames 115 fixed to the support frame 114 and to which the moving unit 120 is in contact, a plurality of guide members 116 connected to the support frame 114 and extending in the Z-axis direction, and a plurality of moving side frames 117 connected to the guide member 116 and the fixed side frame 115 and extending in the X-axis direction.

The plurality of fixed side frames 115 are spaced apart from each other by a predetermined distance in the X-axis direction on the support frame 114 and may oppose each other.

The plurality of guide members 116 extend in the Z-axis direction on the support frame 114, and may be spaced apart from each other by a predetermined distance in the X-axis and Y-axis directions.

The plurality of moving side frames 117 may be spaced apart from each other by a predetermined distance in the Y-axis direction on the support frame 114 and may oppose each other.

The side surface of the object (not illustrated) seated in the support region 111a is in contact with the plurality of guide members 116 and the plurality of moving side frames 117, and the bottom surface of the object (not illustrated) may be in contact with the support frame 114. Accordingly, the object (not illustrated) may be prevented from separating from the support unit 110 or meandering in the support unit 110 while the support unit 110 is moved.

The fixed side frame 115 may be fixed on the support frame 114. In addition, the coupling unit 130 may be provided on one surface on which the fixed side frame 115 faces the mobile robot arm 121. Accordingly, there is no need to replace the fixed side frame 115 whenever the object (not illustrated) is replaced or the standard of the object (not illustrated) is changed, and thus, the contact position between the mobile robot arm 121 and the fixed side frame 115 may be fixedly set.

In an embodiment, the coupling unit 130 may include a first coupling unit 140 on one surface on which the mobile robot arm 121 faces the fixed side frame 115, and a second coupling unit 150 provided on one surface on which the fixed side frame 115 faces the mobile robot arm 121.

The first coupling unit 140 and the second coupling unit 150 are in contact with each other before one surface of the mobile robot arm 121 comes into contact with one surface of the fixed side frame 115, to guide a contact between one surface of the mobile robot arm 121 and one surface of the fixed side frame 115.

In addition, the first coupling unit 140 and the second coupling unit 150 are maintained in mutual contact in a state in which one surface of the mobile robot arm 121 and one surface of the fixed side frame 115 are in contact with each other, thereby further increasing the coupling force between the mobile robot arm 121 and the fixed side frame 115.

Even when the fixed side frame 115 is fixed on the support frame 114 as above, by varying the connection position between the guide member 116 and the moving side frame 117 and the connection position between the moving side frame 117 and the fixed side frame 115, the volume of the support region 111a may be changed according to the standard of the object (not illustrated).

In an embodiment, the position for connecting the plurality of guide frames to the support frame 114 on the X-Y plane is changed, and the position of connecting the plurality of moving side frames 117 to the fixed side frame 115 and the guide member 116 on the X-Y plane is changed, and therefore, the circumferential dimension of the support region 111a may be changed.

Figure 2:
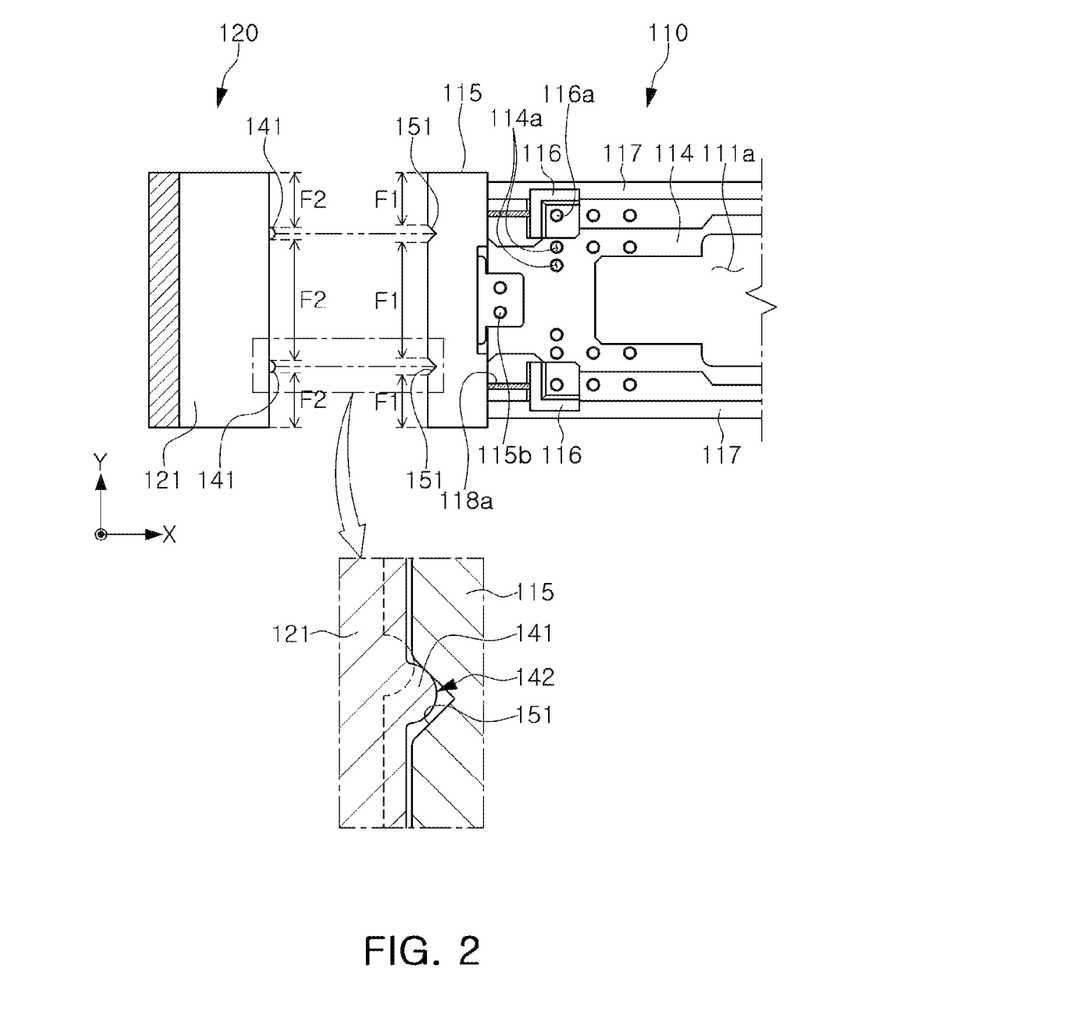
FIG. 2 is a plan view partially illustrating a material transferring apparatus for battery manufacturing according to an embodiment.
Figure 3:
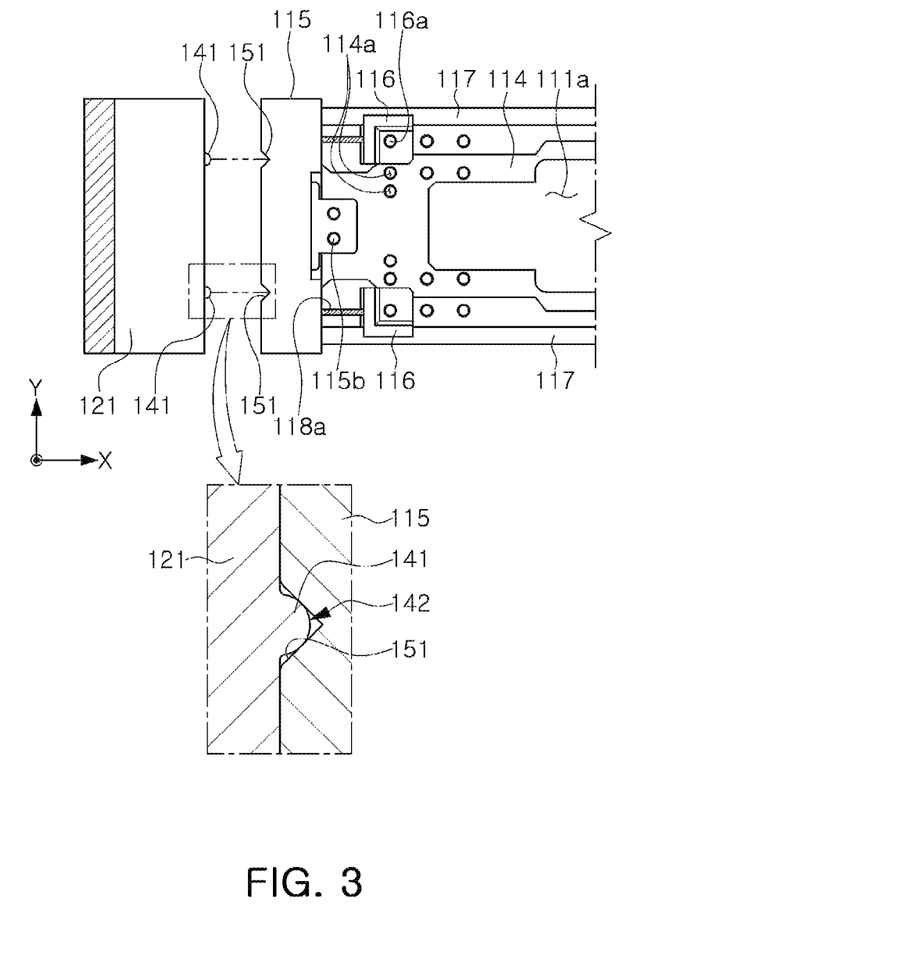
FIG. 3 is a plan view partially illustrating a material transferring apparatus for battery manufacturing according to an embodiment.

FIGS. 2 and 3 are plan views partially illustrating a material transferring apparatus for battery manufacturing according to an embodiment. FIG. 2 is an enlarged view illustrating the state in which a coupling protrusion is being inserted into a coupling groove, and FIG. 3 is an enlarged view of the state in which the insertion of the coupling protrusion into the coupling groove has been completed in the state of FIG. 2. The material transferring apparatus for battery manufacturing according to an embodiment may have a symmetrical shape in a lateral direction with respect to the center line of FIGS. 2 and 3.

As illustrated in FIG. 2, the first coupling unit 140 may include at least one coupling protrusion 141 protruding from the mobile robot arm 121 toward the fixed side frame 115.

In an embodiment, the coupling protrusions 141 may be provided as a pair, and the pair of coupling protrusions 141 may be spaced apart from each other by a predetermined distance in the Y-axis direction. The center of the fixed side frame 115 in the Y-axis direction may be present in a portion of the fixed side frame 115 opposite to the area between the pair of coupling protrusions 141.

In an embodiment, the second coupling unit 150 may include a pair of coupling grooves 151 formed in one surface of the fixed side frame 115 opposite to the coupling protrusion 141. The coupling protrusion 141 may be inserted into the coupling groove 151 in one-to-one correspondence.

According to the coupling protrusion 141 and the coupling groove 151 as described above, the coupling between the mobile robot arm 121 and the fixed side frame 115 may be stably maintained, and while the mobile robot arm 121 lifts and moves the support frame 114, an object (not illustrated) existing in the support region 111a may be prevented from sagging or meandering in any one direction. Also, the fixed side frame 115 may be prevented from slipping away from the mobile robot arm 121 while the mobile robot arm 121 lifts and moves the fixed side frame 115.

In addition, when the center of the fixed side frame 115 in the Y-axis direction exists in a portion of the fixed side frame 115 opposite to the area between the pair of coupling protrusions 141, the centering operation of the fixed side frame 115 by the mobile robot arm 121 may be completed, only by inserting the coupling protrusion 141 into the coupling groove 151 without an additional device or additional operation to couple the mobile robot arm 121 to the fixed side frame 115. Accordingly, the convenience of the movement work may be improved and the movement work period of time may be reduced.

On the other hand, the length of the coupling groove 151 in the X-axis direction may be at least the same as the length of the coupling protrusion 141 in the X-axis direction.

Before one surface of the mobile robot arm 121 comes into contact with one surface of the fixed side frame 115, at least a partial region of the coupling protrusion 141 may be in a state of being inserted into the coupling groove 151.

In an embodiment, the coupling protrusion 141 may include a curved region 142 provided to be rounded, and the coupling groove 151 may include a section inclined at a + slope and a section inclined at a − slope with respect to the Y axis.

The curved region 142 may serve to reduce the contact resistance when the coupling protrusion 141 is inserted into the coupling groove 151. In addition, when the coupling groove 151 includes a section inclined at a + slope and a section inclined at a − slope, slide of the curved region 142 of the coupling protrusion 141 in the coupling groove 151 may be facilitated, thereby contributing to allowing the coupling protrusion 141 to be quickly inserted into the coupling groove 151.

As illustrated in FIG. 3, when the mobile robot arm 121 further moves in the +X direction while the curved region 142 slides in the coupling groove 151, as the curved region 142 slides in the coupling groove 151, the contact between one surface of the mobile robot arm 121 and one surface of the fixed side frame 115 may be completed. As such, after the curved region 142 of the coupling protrusion 141 starts to slide in the coupling groove 151, the operation of aligning the mobile robot arm 121 in the Y-axis direction may be omitted.

The state in which the coupling protrusion 141 is in close contact with the coupling groove 151 and one surface of the mobile robot arm 121 and one surface of the fixed side frame 115 are in contact may be continuously maintained while the mobile robot arm 121 lifts and moves the fixed side frame 115. Therefore, the fixed side frame 115 may be prevented from being separated from the mobile robot arm 121 while the mobile robot arm 121 lifts and moves the fixed side frame 115.

As illustrated in FIGS. 2 and 3, the fixed side frame 115 may be fixed to the support frame 114 by a first fastening member 115b. In an embodiment, the first fastening member 115b may be a bolt. The fixed side frame 115 may be fixed on the support frame 114 as the bolt passes through the fixed side frame 115 and is fixed to the support frame 114.

The support frame 114 may include a plurality of first fastening holes 114a spaced apart from each other by a predetermined distance in the Y-axis direction. A second fastening member 116a penetrating through the guide member 116 may be coupled to the first fastening hole 114a. The length of the support region 111a in the Y-axis direction may be determined depending on the first fastening hole 114a to which the second fastening member 116a is coupled.

Figure 4:
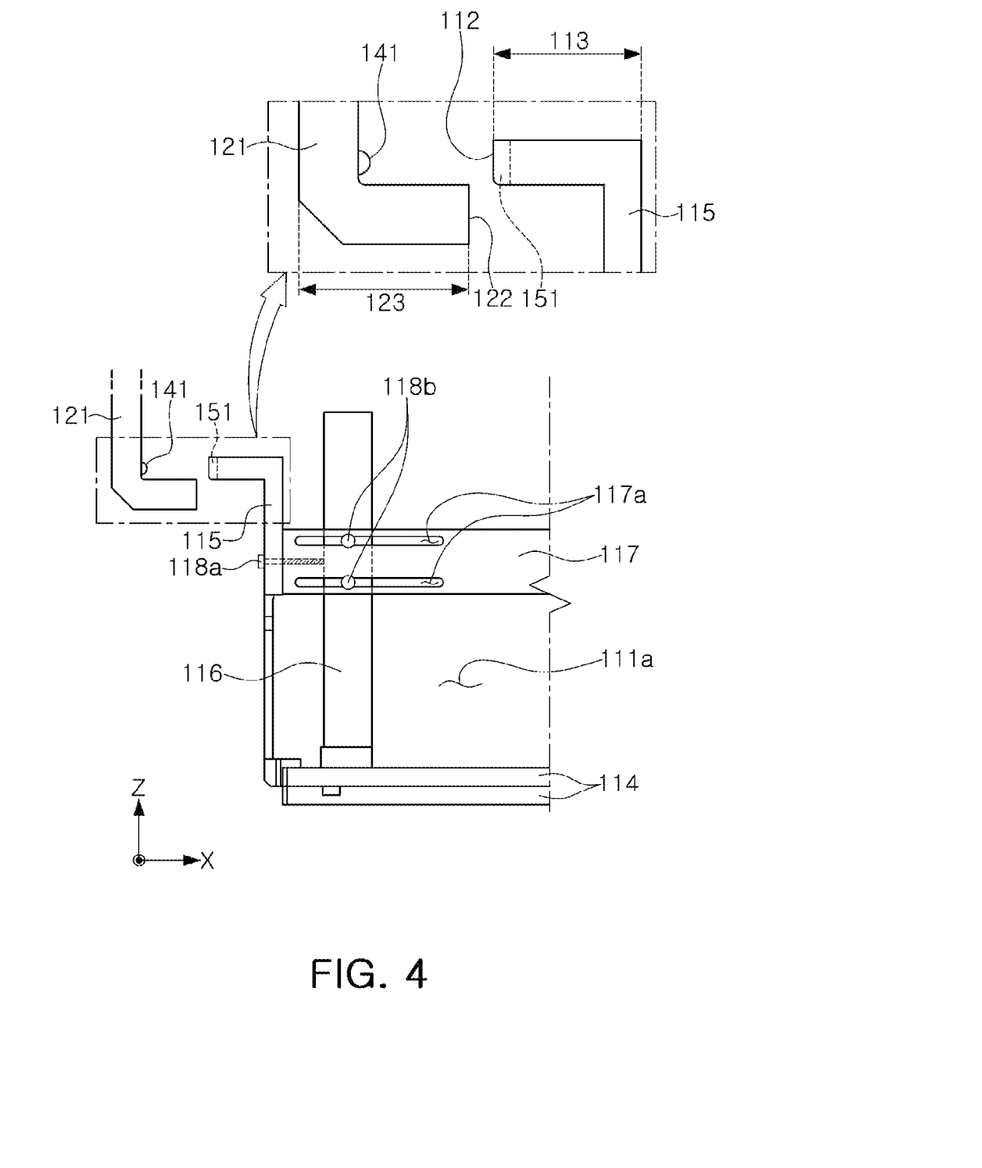
FIG. 4 is a front view partially illustrating a material transferring apparatus for battery manufacturing according to another embodiment.
Figure 5:
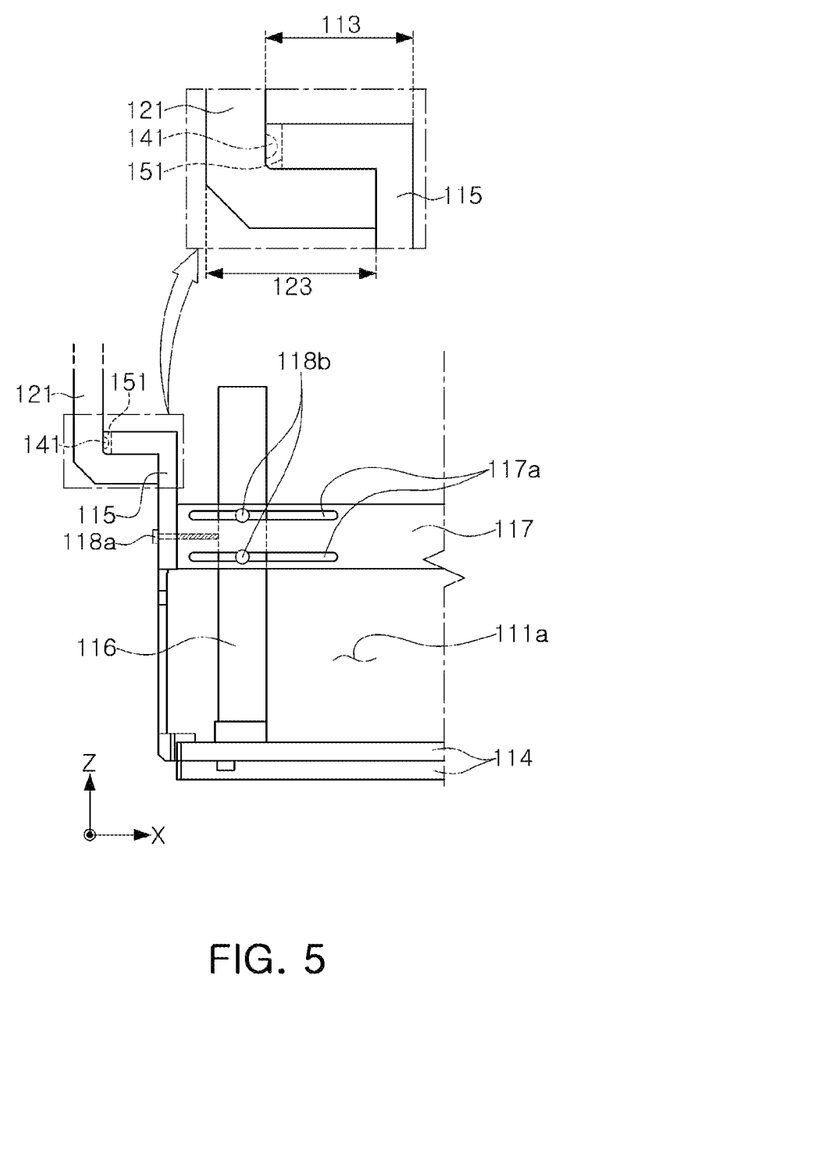
FIG. 5 is a view illustrating a state in which a coupling protrusion is inserted into a coupling groove in the state of FIG. 4.

FIGS. 4 and 5 are front views partially illustrating a material transferring apparatus for battery manufacturing according to another embodiment. FIG. 4 is a front view of a state before the coupling protrusion 141 is inserted into the coupling groove 151, and FIG. 5 is a front view of a state in which the coupling protrusion 141 has been inserted into the coupling groove 151. The material transferring apparatus for battery manufacturing may have a symmetrical shape laterally with respect to the center line of FIGS. 4 and 5.

As illustrated in FIG. 4, the mobile robot arm 121 may include a first bent extension portion 123 extending by bending an end 122 in the direction of the fixed side frame 115. The first bent extension portion 123 may be provided below the coupling protrusion 141 in the −Z direction.

The fixed side frame 115 may include a second bent extension portion 113 extending by bending an end 112 in the direction of the first bent extension portion 123.

In the state of FIG. 4, the mobile robot arm 121 is further moved in the +X direction, and as illustrated in FIG. 5, when the insertion of the coupling protrusion 141 into the coupling groove 151 is completed, the first bent extension portion 123 and the second bent extension portion 113 may be in contact with each other.

In a state in which the first bent extension portion 123 and the second bent extension portion 113 are in contact with each other, the first bent extension portion 123 may be provided below the second bent extension portion 113 in the −Z direction. Also, the contact state between the first bent extension portion 123 and the second bent extension portion 113 may be maintained while the mobile robot arm 121 moves the support unit (110 of FIG. 1). Accordingly, while the mobile robot arm 121 lifts the fixed side frame 115 and moves the support unit (110 in FIG. 1), the second bent extension portion 113 is in further close contact with the first bent extension portion 123 by the weight of the support unit (110 in FIG. 1). Therefore, the coupling force between the mobile robot arm 121 and the fixed side frame 115 may further increase, and the mobile robot arm 121 may more easily support the load of the support unit (110 of FIG. 1) and the object (not illustrated) seated in the support region 111a. Also, the coupling protrusion 141 may be prevented from being separated from the coupling groove 151.

In an embodiment, the coupling protrusion 141 and the fixed side frame 115 may be formed of a material including magnetic properties. Accordingly, the coupling protrusion 141 may be more easily inserted into the coupling groove 151 by magnetic force, and even when the coupling protrusion 141 is outside the coupling groove 151, the coupling protrusion 141 may be easily guided to the coupling groove 151. In addition, it may be easier to maintain the state in which the coupling protrusion 141 is inserted into the coupling groove 151.

In an embodiment, a magnetic body (not illustrated) may be embedded in the coupling protrusion 141 and the fixed side frame 115.

In an embodiment, the fixed side frames 115 may be provided as a pair, and a pair of fixed side frames 115 may be disposed to be spaced apart from each other in the X-axis direction. A pair of fixed side frames 115 may surround a portion of the support region 111a.

A pair of mobile robot arms 121 may also be provided to correspond to a pair of fixed side frames 115. A pair of mobile robot arms 121 may also be spaced apart by a first length in the X-axis direction, and the pair of mobile robot arms 121 may contact the fixed side frame 115, while being spaced apart by the first length.

The first length may be a value corresponding to a separation distance in a direction parallel to the X-axis, from the end 122 of one mobile robot arm 121 to the end 122 of another mobile robot arm (121 in FIG. 1).

The pair of mobile robot arms 121 may contact the pair of fixed side frames 115 while maintaining a state of being spaced apart by the first length.

In an embodiment, in the pair of fixed side frames 115, surfaces with which the pair of mobile robot arms 121 are in contact may be spaced apart from each other by a first length in the X-axis direction. Accordingly, the alignment operation between the mobile robot arm 121 and the fixed side frame 115 may be omitted. In addition, the mobile robot arm 121 may be brought into close contact with the fixed side frame 115 regardless of whether the length of the object (M in FIG. 6) existing in the support region 111a is changed. Accordingly, even in a case in which the length of the object (M in FIG. 6) is changed, there is no need to perform a separate alignment operation between the mobile robot arm 121 and the fixed side frame 115, thereby contributing to improving battery productivity.

Figure 6:
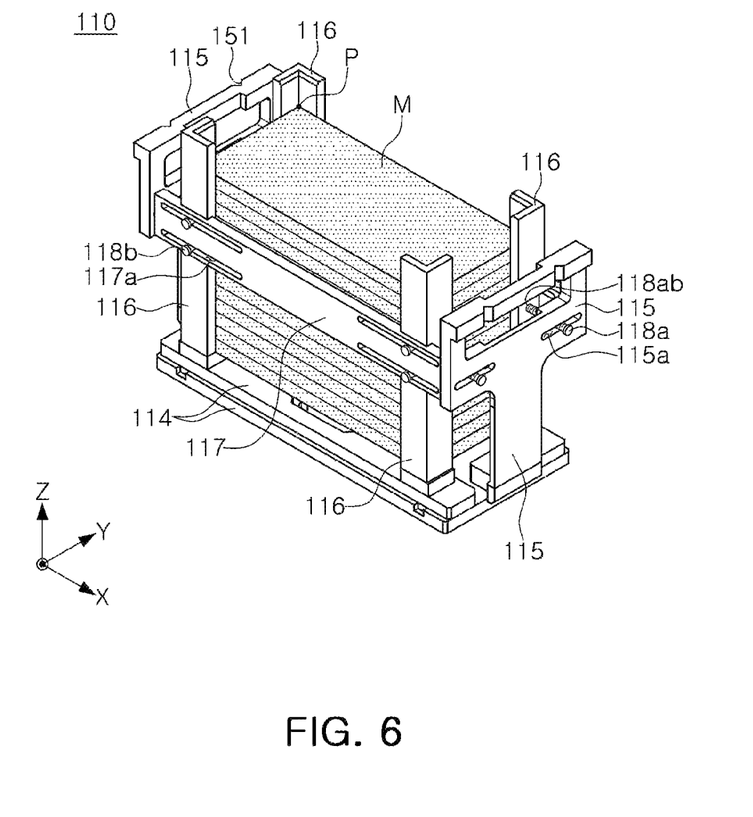
FIG. 6 is a perspective view of a support unit according to an embodiment.

FIG. 6 is a perspective view of the support unit 110 according to an embodiment.

As illustrated in FIG. 6, the object may be seated on an upper portion of the support frame 114 in the +Z direction. The object may be provided as a plurality of objects, and the plurality of objects may be stacked in the +Z direction. In an embodiment, the object may be an electrode plate on which the notching operation has been completed.

The guide member 116 may be in close contact with each vertex P of the stacked object and the area around the vertex P. The guide member 116 may extend in the stacking direction of the objects to be in close contact with all of the plurality of objects present on the support frame 114. According to the guide member 116, the stacked object may be prevented from shaking in the support frame 114 or from being separated from the support frame 114.

The moving side frame 117 may be supported on the guide member 116 to face the side of the object. This moving side frame 117 may protect the side of the object and may prevent the object from being separated in the Y-axis direction.

Figure 7:
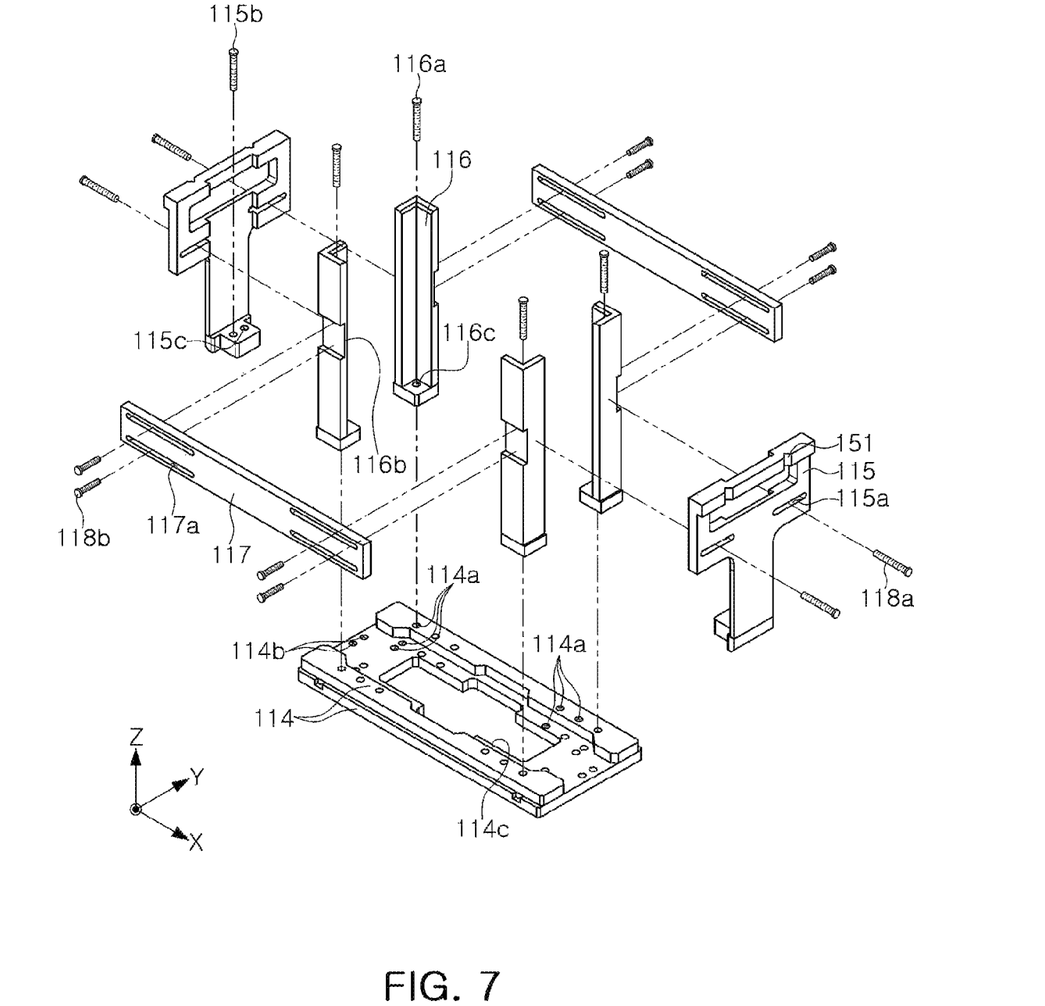
FIG. 7 is an exploded perspective view of a support unit according to an embodiment.

FIG. 7 is an exploded perspective view of the support unit 110 according to an embodiment.

As illustrated in FIG. 7, the support frame 114 may include a plurality of first fastening holes 114a disposed to be spaced apart from each other in the longitudinal and width directions of the object (M in FIG. 6), and a plurality of second fastening holes 114b disposed to be spaced apart from each other in the width direction of the object (M in FIG. 6). The guide member 116 may be opposed to the first fastening holes 114a, and the fixed side frame 115 may be opposed to the second fastening holes 114b.

A pair of fixed side frames 115 are spaced apart from each other by a predetermined distance in the X-axis direction on the support frame 114, and may be disposed to oppose each other. A plurality of third fastening holes 115c may be provided in the plurality of fixed side frames 115. The plurality of third fastening holes 115c may be disposed to be spaced apart from each other in the width direction of the object (M in FIG. 6), and the plurality of third fastening holes 115c may face the plurality of second fastening holes 114b formed in the support frame 114.

A fastening member (not illustrated) may be inserted into the second fastening hole 114b and the third fastening hole 115c to fix the fixed side frame 115 to the support frame 114. The second fastening hole 114b and the third fastening hole 115c are provided as a plurality of holes, and when a fastening member (not illustrated) is inserted in each of the second fastening holes 114b and the third fastening holes 115c, the fixed side frame 115 may be more firmly fixed to the support frame 114.

The fixed side frame 115 may include a plurality of first gap adjustment holes 115a. The first gap adjustment hole 115a may have a slit shape as a through hole formed in the Y-axis direction. A first fixing member 118a may be inserted into the first gap adjustment hole 115a. An end 118ab of the first fixing member 118a may contact one surface of the guide member 116.

In the guide member 116, four guide members 116 may be provided on one support frame 114, and each of the guide members 116 may include a fourth fastening hole 116c. The fourth fastening hole 116c may face the first fastening hole 114a formed in the support frame 114 in a one-to-one manner. The guide member 116 may be fixed to the support frame 114 by inserting a fastening member (not illustrated) into the first fastening hole 114a and the fourth fastening hole 116c.

Since the plurality of first fastening holes 114a are disposed to be spaced apart from each other in the longitudinal direction and the width direction of the object (M in FIG. 6), the fourth fastening hole 116c may be opposed to the first fastening hole 114a provided in a position corresponding to the length and width of the object (M in FIG. 6). When a fastening member (not illustrated) is inserted into the first fastening hole 114a and the fourth fastening hole 116c, the guide member 116 may be fixed to the support frame 114. Accordingly, the guide member 116 may be fixed at a position in which the guide member 116 may be brought into close contact with the vertex (P in FIG. 6) of the object (M in FIG. 6).

For example, when the length and width of the object (M in FIG. 6) are changed, by changing the first fastening hole 114a opposite to the fourth fastening hole 116c, the guide member 116 may be brought into close contact with the object (M in FIG. 6).

In an embodiment, the fastening member (not illustrated) may include a first fastening member 115b inserted into the second fastening hole 114b of the support frame 114 and the third fastening hole 115c of the fixed side frame 115, and a second fastening member 116a inserted into the first fastening hole 114a of the support frame 114 and the fourth fastening hole 116c of the guide member 116. In an embodiment, the first fastening member 115b and the second fastening member 116a may be bolts.

According to the above configuration, the separation distance between the pair of guide members 116 in the width direction (Y-axis direction) and the longitudinal direction (X-axis direction) of the object (M in FIG. 6) may be adjusted, and even when the length and width of the object (M in FIG. 6) is changed, the guide member 116 may be brought into close contact with the vertex (P in FIG. 6) of the object (M in FIG. 6).

On the other hand, the moving side frame 117 may be provided as a pair, and the pair of moving side frames 117 may be coupled to concave portions 116b of the guide member 116 to be spaced apart from each other in the Y-axis direction on the support frame 114. The moving side frame 117 may be provided with a plurality of second gap adjustment holes 117a, and the second gap adjustment hole 117a may be provided in the form of a slit as a through hole. A second fixing member 118b is inserted into the second gap adjustment hole 117a such that an end 118ba of the second fixing member 118b may be in contact with one surface of the guide member 116. In an embodiment, the second fixing member 118b may be a bolt. Accordingly, even when the guide member 116 is moved in the X-axis direction, the moving side frame 117 and the guide member 116 may be easily combined.

In an embodiment, the support frame 114 may be formed by stacking a plurality of support frames in the Z-axis direction. The plurality of support frames 114 may be welded to each other or bolted to each other. In an embodiment, the support frame 114 present at the upper part in the +Z direction may be provided as a pair, and a distance between the pair of support frames 114 in the Y-axis direction may be shorter than a length of the support frame 114 provided therebelow in the Y-axis direction.

Accordingly, the support frame 114 may have a stepped portion 114c. When the gap between the pair of guide members 116 in the Y-axis direction is relatively narrowed, the stepped portion 114c may be in close contact with one surface of the guide member 116 present on the X-Z plane. Accordingly, the guide member 116 may be prevented from being pushed out in the outer circumferential direction of the support frame 114, and the guide member 116 may be supported more firmly.

Figure 8:
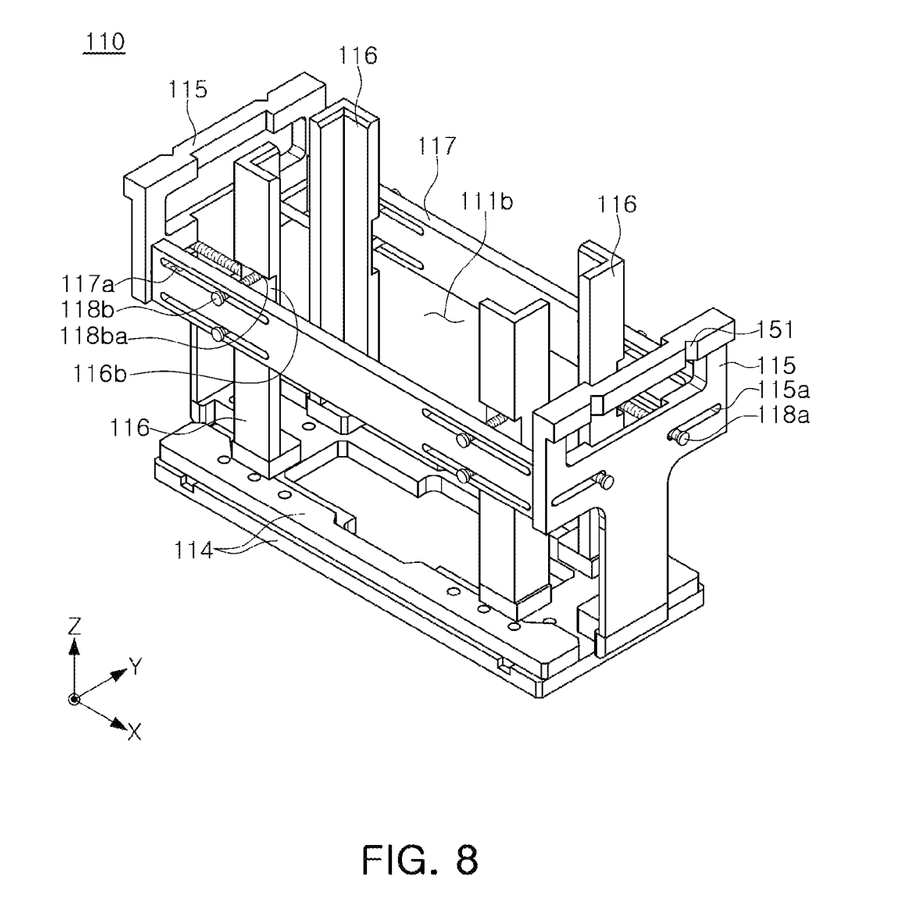
FIG. 8 is a perspective view of a support unit according to another embodiment.

FIG. 8 is a perspective view of the support unit 110 according to another embodiment.

As illustrated in FIG. 8, the plurality of guide members 116 may be moved in the X-axis direction and the Y-axis direction with respect to the fixed side frame 115 and the moving side frame 117, to be fixed to the support frame 114. Accordingly, a support region 111b deformed inwardly of the plurality of guide members 116 may be formed. The deformed support region 111b may have a narrower area than that of the support region (see 111a of FIG. 1) formed in FIG. 1, which may be suitable for supporting an object (not illustrated) of which the area is narrower than that of the object (not illustrated) to be seated in the support region of FIG. 1 (111a in FIG. 1).

In this manner, by moving the guide member 116, the area of the support regions 111a and 111b may be appropriately deformed to fit the area of the object (M in FIG. 6). Accordingly, there is no need to replace the support unit 110 whenever the area of the object (M in FIG. 6) changes, and maintenance costs of the apparatus may be reduced, and manufacturing costs may also be reduced.

As set forth above, according to an embodiment of the present disclosure, battery manufacturing efficiency may be improved.

In addition, according to an embodiment, the battery manufacturing process may be automated, and the convenience of battery manufacturing operations may be improved.

While example embodiments have been illustrated and described above, it will be apparent to those skilled in the art that modifications and variations could be made without departing from the scope of the present disclosure as defined by the appended claims.

What is claimed is:

1. A material transferring apparatus for battery manufacturing, comprising:
    a support unit having a support region for supporting an object and having a first contact surface;
    a moving unit having a second contact surface in contact with the support unit and moving the support unit; and
    coupling units provided on the support unit and the moving unit, respectively, and contacting each other before the first contact surface and the second contact surface come into contact with each other,
    wherein the support unit includes,
    a support frame having the support region; and
    a guide frame connected to the support frame and disposed at the periphery of the support region to contact the object,
    wherein the guide frame is provided to vary an area of the support region,
    wherein the guide frame includes,
    a fixed side frame fixed to the support frame and contacting the moving unit;
    a guide member connected to the support frame and extending in a thickness direction of the object to contact a side surface of the object; and a moving side frame connected to the guide member and the fixed side frame and extending in a longitudinal direction or a width direction of the object, wherein the moving side frame is provided such that a position connected to the fixed side frame and the guide member is varied to vary the area of the support region, wherein the support frame includes, a plurality of first fastening holes spaced apart from each other in the longitudinal direction and the width direction of the object; and a plurality of second fastening holes spaced apart from each other in the width direction of the object, wherein the fixed side frame includes a plurality of third fastening holes facing the plurality of second fastening holes, the guide member includes a fourth fastening hole opposite to the plurality of first fastening holes, and the plurality of first fastening holes, the plurality of second fastening holes, the plurality of third fastening holes and the fourth fastening hole are provided with a fastening member inserted thereinto.

2. The material transferring apparatus of claim 1, wherein the coupling units are maintained in a state of being in contact with each other while the first contact surface and the second contact surface are in contact with each other.

3. The material transferring apparatus of claim 1, wherein the coupling units includes, a first coupling unit provided in a region facing the fixed side frame in the moving unit; and a second coupling unit provided in a region facing the moving unit in the fixed side frame, wherein the first coupling unit and the second coupling unit are provided to be in contact with each other before the moving unit and the fixed side frame come into contact, and are maintained in a state of being in contact with each other while the moving unit contacts the fixed side frame.

4. The material transferring apparatus of claim 3, wherein the first coupling unit includes at least one coupling protrusion protruding from the moving unit toward the fixed side frame, and the second coupling unit includes at least one coupling groove, which is disposed in the fixed side frame and into which the coupling protrusion is inserted.

5. The material transferring apparatus of claim 4, wherein the coupling protrusion and the fixed side frame include a magnetic material.

6. The material transferring apparatus of claim 4, wherein the coupling protrusion includes a curved region sliding in the coupling groove.

7. The material transferring apparatus of claim 6, wherein the coupling groove includes a section inclined with respect to the longitudinal direction of the object.

8. A material transferring apparatus for battery manufacturing, comprising:

a support unit having a support region for supporting an object and having a first contact surface;

a moving unit having a second contact surface in contact with the support unit and moving the support unit; and coupling units provided on the support unit and the moving unit, respectively, and contacting each other before the first contact surface and the second contact surface come into contact with each other, wherein the support unit includes, a support frame having the support region; and a guide frame connected to the support frame and disposed at the periphery of the support region to contact the object, wherein the guide frame is provided to vary an area of the support region, wherein the guide frame includes, a fixed side frame fixed to the support frame and contacting the moving unit;

a guide member connected to the support frame and extending in a thickness direction of the object to contact a side surface of the object; and a moving side frame connected to the guide member and the fixed side frame and extending in a longitudinal direction or a width direction of the object, wherein the moving side frame is provided such that a position connected to the fixed side frame and the guide member is varied to vary the area of the support region, wherein the moving unit includes at least one mobile robot arm in contact with the fixed side frame, wherein the at least one mobile robot arm includes a first bent extension portion provided by bending and extending an end thereof in a direction of the fixed side frame, the fixed side frame includes a second bent extension portion provided by bending and extending an end thereof in a direction of the at least one mobile robot arm and contacting the first bent extension portion, and the first bent extension portion is present below the second bending extension portion in a direction of gravity, while the at least one mobile robot arm moves the support unit.

9. A material transferring apparatus for battery manufacturing, comprising:

a support unit having a support region for supporting an object and having a first contact surface;

a moving unit having a second contact surface in contact with the support unit and moving the support unit; and coupling units provided on the support unit and the moving unit, respectively, and contacting each other before the first contact surface and the second contact surface come into contact with each other, wherein the support unit includes, a support frame having the support region; and a guide frame connected to the support frame and disposed at the periphery of the support region to contact the object, wherein the guide frame is provided to vary an area of the support region, wherein the guide frame includes, a fixed side frame fixed to the support frame and contacting the moving unit;

a guide member connected to the support frame and extending in a thickness direction of the object to contact a side surface of the object; and a moving side frame connected to the guide member and the fixed side frame and extending in a longitudinal direction or a width direction of the object, wherein the moving side frame is provided such that a position connected to the fixed side frame and the guide member is varied to vary the area of the support region, wherein a plurality of the fixed side frames are disposed to face each other in the support frame and include one or more first gap adjustment holes, a plurality of the moving side frames are disposed to face each other in the support frame and include one or more second gap adjustment holes, and a plurality of the guide members are disposed to face the first gap adjustment hole and the second gap adjustment hole, and wherein the support unit further comprises, one or more first fixing members inserted into the one or more first gap adjustment holes, ends of the one or more first fixing members being in contact with the guide member; and a plurality of second fixing members inserted into the one or more second gap adjustment holes, ends of the plurality of second fixing member being in contact with the guide member.

10. The material transferring apparatus of claim 1, wherein the fastening member includes, a first fastening member inserted into the plurality of second fastening holes and the plurality of third fastening holes to fix the fixed side frame to the support frame; and a second fastening member inserted into the plurality of first fastening holes and the fourth fastening hole to fix the guide member to the support frame.

11. The material transferring apparatus of claim 8, wherein a plurality of the fixed side frames are spaced apart from each other in the longitudinal direction or the width direction of the object, a plurality of the mobile robot arms are in contact with the plurality of fixed side frames in a state in which ends thereof are spaced apart from each other by a first length, and a plurality of the fixed side frames are fixed to the support frame in such a manner that surfaces in contact with the plurality of mobile robot arms are spaced apart by the first length.

* * * * *

UNITED STATES PATENT AND TRADEMARK OFFICE
CERTIFICATE OF CORRECTION

| | | |
|---|---|---|
| PATENT NO. | : 12,394,814 B2 | Page 1 of 1 |
| APPLICATION NO. | : 17/949704 | |
| DATED | : August 19, 2025 | |
| INVENTOR(S) | : Hwa Sun Choi et al. | |

It is certified that error appears in the above-identified patent and that said Letters Patent is hereby corrected as shown below:

On the Title Page

Item (30) Foreign Application Priority Data please insert the following:
--January 19, 2022 (KR) ................... 10-2022-0007639--

Signed and Sealed this
Ninth Day of December, 2025

John A. Squires
*Director of the United States Patent and Trademark Office*